Feb. 21, 1933.  F. L. FULLER  1,898,045
CASH REGISTER
Filed April 1, 1926   6 Sheets-Sheet 1

INVENTOR
Frederick L. Fuller
BY
ATTORNEYS

Feb. 21, 1933.   F. L. FULLER   1,898,045
CASH REGISTER
Filed April 1, 1926   6 Sheets-Sheet 3

INVENTOR
Frederick L. Fuller.
BY
ATTORNEYS

Fig. 4.

Feb. 21, 1933.  F. L. FULLER  1,898,045
CASH REGISTER
Filed April 1, 1926   6 Sheets-Sheet 5

Fig. 5.

INVENTOR.
Frederick L. Fuller.
BY
ATTORNEYS

Feb. 21, 1933.  F. L. FULLER  1,898,045
CASH REGISTER
Filed April 1, 1926  6 Sheets-Sheet 6

INVENTOR.
Frederick. L. Fuller
BY
ATTORNEYS

Patented Feb. 21, 1933

1,898,045

UNITED STATES PATENT OFFICE

FREDERICK L. FULLER, OF ILION, NEW YORK, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed April 1, 1926. Serial No. 99,021.

This invention relates generally to improvements in cash registers and has particular reference to improvements in the printing mechanisms of such machines.

In the accompanying drawings the improvements are applied to the construction shown and described in U. S. Patent 1,742,701 granted January 7, 1930 to Frederick L. Fuller and the British patents to Frederick L. Fuller, 135,456; 140,363; 157,823; 157,824 and 157,825 for the same invention. As will be more clearly apparent later on, however, the improvements are capable of being applied to or embodied in a number of other forms of cash registers and accounting machines, without departing from the spirit of the invention.

A broad object of the invention is to provide a printing mechanism for printing and issuing checks or printing upon sales slips inserted to receive impressions, preferably with an automatic device whereby the mechanism may be conditioned for either check printing or sales slip printing.

Another object of the invention is to provide interlocking devices effective to insure correct operation of the improved machine as a whole when the printing mechanism is in check printing condition; and automatic devices by means of which the interlocking devices may be rendered ineffective when the machine is to be utilized for printing upon an inserted sales slip. In the present preferred embodiment the printing mechanism comprises devices for printing certain data including devices for printing the serial or consecutive numbers as well as the date of the transaction upon issued checks.

With the foregoing and other objects in view, the invention consists in the novel combinations and arrangement of parts, the features of novelty of which are pointed out in the appended claims and a preferred embodiment of which is shown in the accompanying drawings.

As shown in the drawings, the machine used to illustrate one embodiment of the invention is of the key operated type, that is, various functions, such as, indicating, registering, and printing are effected directly by operation of the keys. Addition of the present improvements does not materially affect the operation of such a machine in any of these respects, but when the keys are operated type carriers forming a part of the new mechanism are adjusted to represent the keys and impressions are then taken from the type carriers upon either a check strip or upon a sales slip depending upon which kind of printing the machine is required to perform by the nature of the transaction.

In case the mechanism has been prepared or conditioned for check printing, after the keys have been operated and the characters representing them printed on the check strip a lever or handle is operated to feed a portion of the check strip containing the record of the keys operated to a position where it may be severed from the strip. The feeding operation is performed by a pair of cooperating rollers driven by the handle, one of which rollers is provided with inked type for printing advertising or other matter on the check.

For certain classes of transactions, such as "charge" transactions, it is desirable to have the machine so constructed as to print upon an itemized "charge" slip a total of the items, thereby providing a way of insuring the making of a record of the transaction in the record retaining devices of the machine. The improved machine is provided with a slot into which sales slips may be inserted to receive impressions.

In the present embodiment, when the machine is adapted to print upon an issued check, an interlocking mechanism controlling the sequence of operation of the keys and the check feeding mechanism and printing mechanism is rendered effective.

The present embodiment is provided with an automatic device in the nature of a testing device which controls the unlocking of the check printing and feeding mechanism. This device is operated during each item entering operation and when a slip has been inserted the testing device will have no effect upon the locking mechanism for the check lever so that it cannot be actuated. To print upon sales slips all that is necessary is to insert slips to a position where they may receive impressions from the type carriers and then depress the keys representing the items. This causes the items to be printed upon the slips, after which the slips are simply withdrawn from the machine. Since the interlocking mechanism referred to is prevented from going into operation by the presence of a slip the operating keys may be subsequently depressed without necessitating the operation of the check lever.

When, however, no slip has been inserted and a check is desired the absence of an inserted slip will permit the interlocking devices to be effective and will permit the unlocking of the check lever for actuation. After an actuation of the check lever the check lever again becomes locked, thereby preventing a second operation of the check lever until the keys have again been depressed.

Associated with the interlocking mechanism are certain devices for preventing an operation of the check lever while the keys are being depressed even though during the interim the absence of an inserted slip has allowed the testing device to disable one of the locking devices for the check lever.

The operating keys 30 (Figs. 1 and 3) work in slots 31 in the casing of the machine, and are pivoted upon a rod 32 extending across the machine. Resting upon all of the keys is a key coupler 33 pivoted between the side frames 34 of the machine. When the outer ends of the keys are depressed the key coupler is rocked clock-wise on its pivot and engages with notches 351 in the rear portions of the keys. The construction and purpose of such key coupler mechanisms are well known in the art and need not be described in detail.

Connected to the key coupler 33 is a double rack 35 (see Figs. 2, 3 and 4) the connection being such that as the key coupler is rocked by the keys the rack 35 is raised and lowered. The teeth of the double rack 35 engage a gear 36 (Fig. 2) secured to a transverse shaft 37, first on one side of the gear and then the other, in such a way that a complete movement of the key coupler 33 and double rack 35 will effect a complete rotation of the gear 36 and shaft 37. The shaft 37 carries cams and other devices for operating various parts of the mechanism. This rack mechanism for effecting rotation of the shaft has not been described in detail because it is so old and well known.

The two keys 38 and 39 (Figs. 1 and 2) are the keys for two clerks or two departments. For convenience they will be referred to as the "A" and "B" clerks' keys. They are connected with and operate mechanism for controlling engagement of either a totalizer "A" or the totalizer "B". The particular construction of the totalizers and the engaging mechanism is not involved in this invention, and is not shown or described in this application. A showing and description of one form may be found, however, in the United States and British patents to Fuller above mentioned.

The "A" key 38 in addition to its totalizer selecting or engaging function operates an indicator and does certain other work, but is not connected to devices for setting a type carrier. The machine shown in the prior Fuller application has, however, a type carrier for printing either the letter A or the letter B, and, in addition thereto, a similar type carrier is included in the present mechanism. The position of these two type on the carrier relative to the printing point is controlled by the "B" key 39.

Journalled in brackets 40 (Fig. 2) screwed to the base of the machine is a transverse shaft 41 the left end of which has secured to it a cam plate 42 provided with a cam slot (not shown) in cooperation with a stud 43 carried by the B key 39. The construction of the cam slot is such that when the B key 39 is depressed the shaft 41 will be rocked and when the key 39 returns to its normal position the shaft 41 will be restored to its starting point. For setting the clerks' type carrier of the old recording mechanism (which is not shown in the present application) there is provided a segmental rack 44 (Fig. 2) pivoted upon a shaft 45, the forward end of the rack having a suitable link 451 connected to it and to an arm 46 secured to the shaft 41 in such a way that rocking of the shaft 41 will move the segmental rack 44 and directly move the type carrier from one position to the other.

The illustrative machine is provided with three banks of amount keys 30; nine penny keys for entering amounts from 1¢ to 9¢, nine dime keys for entering amounts from 10¢ to 90¢ and seven dollar keys for amounts ranging from $1.00 to $7.00. These keys are arranged to actuate the totalizer elements and set the type carriers in the new and old recording mechanism so that an amount may be printed upon suitable record material commensurate with the amount entered.

Figures 1, 9:
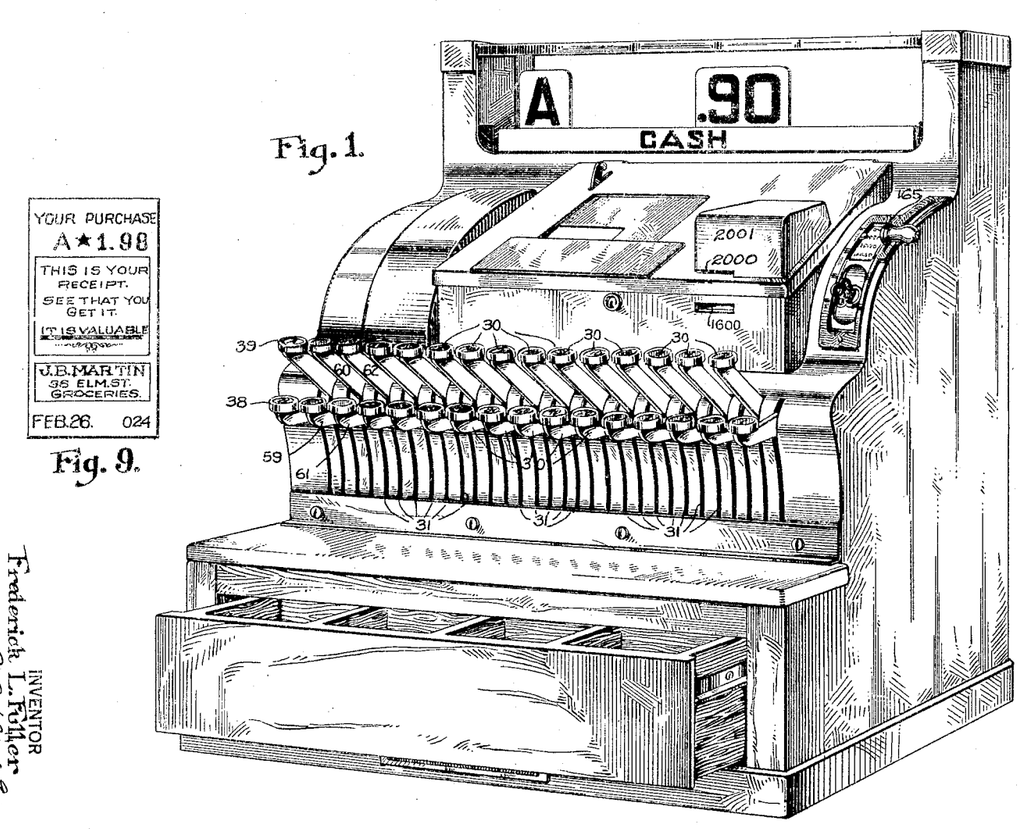
Fig. 1 is a perspective view of one of the machines to which the present invention has been applied.
Fig. 9 shows one of the checks issued by the illustrative embodiment.
Figure 2:
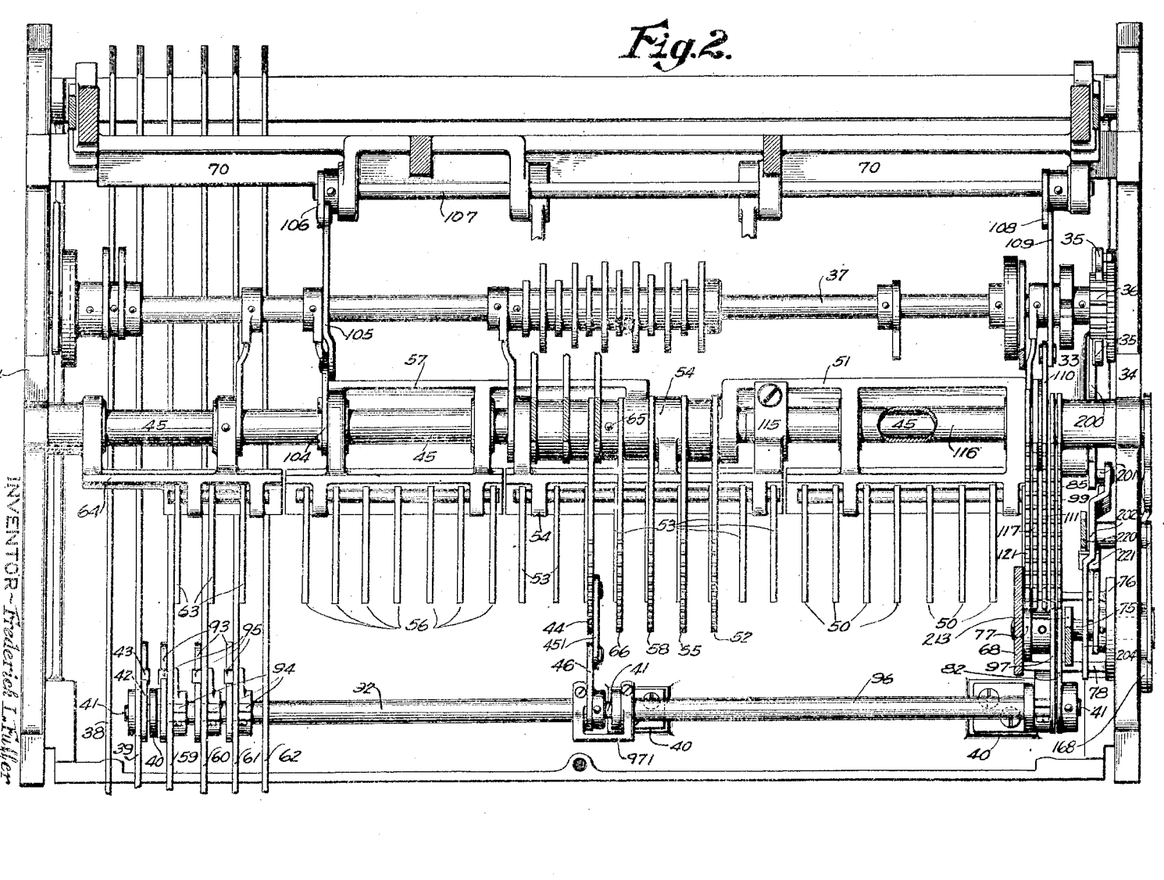
Fig. 2 is a sectional view of the machine with the cabinet removed showing the connections between the different banks of keys and the segmental racks for driving the type carriers of the new printing mechanism.
Figure 3:
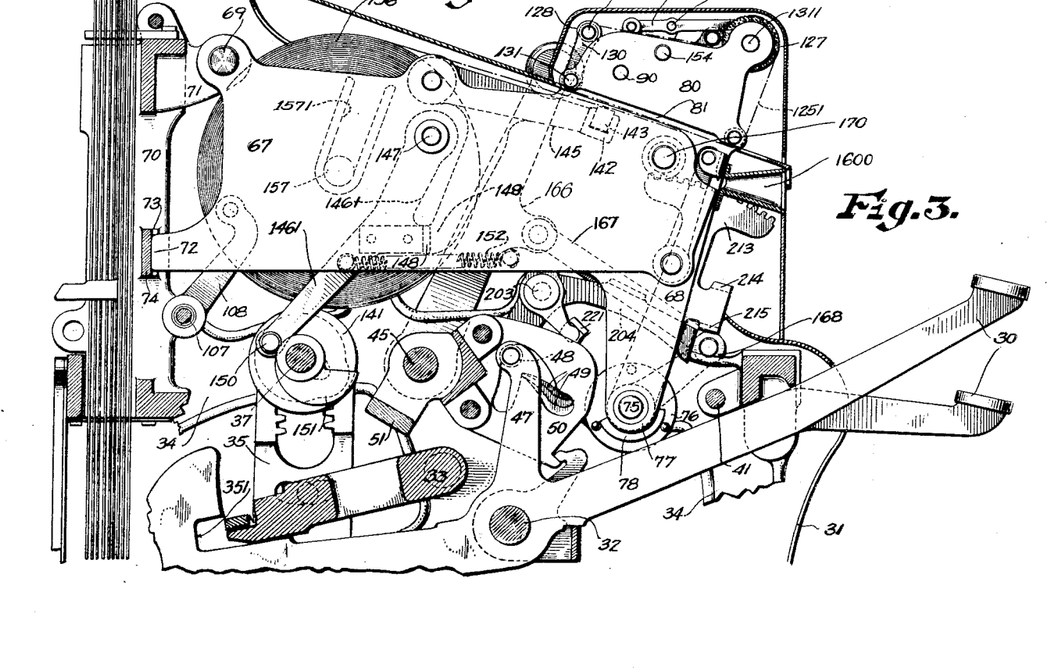
Fig. 3 is a vertical sectional view of the improved machine showing several of the amount keys, the associated differential mechanism and part of the new printing mechanism.

The penny keys occupy the extreme right hand of the keyboard as shown in Fig. 1, several of these keys also being illustrated in Fig. 3. Referring to the latter figure it will be seen that each key 30 is provided with an upwardly extending arm 47 provided with a roller 48. The rollers 48 on the keys cooperate with graduated slots 49 formed in a plurality of cam plates 50 carried by a differentially moved frame 51 (see also Fig. 2) mounted loosely on the shaft 45 hereinbefore referred to. The slots in the plates 50 are so graduated that depression of a key in the particular bank will impart a movement to the frame 51 and parts movable therewith a distance corresponding with the value of the key. Secured to the left end of the frame 51 is a segmental rack 52 adapted to set the type carrier of the old recording mechanism and differentially actuate the totalizer element of the units denominational order.

Another bank of nine keys 30 for dimes or tens of cents is arranged to the left of the bank of penny keys 30, the construction and operation being similar to the penny keys just described. Each dime key has associated therewith a cam plate 53 (Fig. 2) rigid with a differentially movable frame 54, having secured thereto a segmental rack 55 for setting the type carrier of the old recording mechanism and actuating the totalizer element of the tens of cents denominational order.

The seven keys relating to the dollars item entering keys operate upon a corresponding number of cam plates 56 mounted in a differential frame 57 having secured thereto at the right end a segmental rack 58 for actuating the dollars denominational totalizer element and setting the associated type carrier.

The illustrative machine also has four special or transaction keys for "paid out", "charge", "received on account", and "no sale", items designated respectively by reference numerals 59, 60, 61 and 62. (Figs. 1 and 2). The "no sale" key 62 has certain functions, such as operating a drawer release mechanism, but it does not set a type carrier. There is a type carrier provided for printing the characters designating the various special keys, but it is normally held in a position where it prints a character representing either "no sale" or "cash" and is shifted to any of the three other positions by one of the keys 59, 60, and 61. Each of these keys is provided with an upwardly extending arm like the arm 47 in Fig. 3, of one of the penny keys, carrying a roller engaging cam slots in plates 63 rigidly mounted in a frame 64 secured to the segment shaft 45. The cam slots in the plates 63 are differentially arranged, and secured to the segment shaft by a pin 65 is a segmental rack 66 for setting the type carrier (not shown) of the old printing mechanism for printing characters to represent the various classes of transactions.

In addition to having a recording mechanism for printing the amounts and identifying characters upon the old record strip retained within the machine, the machine shown herein is provided with a suitable printing mechanism for either printing upon an issued check or upon an inserted slip. This is what has been referred to hereinbefore as the new recording mechanism.

Being thus provided with a check issuing and slip printing device and a record strip, the machine affords protection to the customer or payer and also to the proprietor or manager of the business. The issued check or inserted slip which is printed upon is given to the customer as a receipt, and the record strip receives an impression identical with that printed on the issued check or the inserted slip so that the proprietor is provided with a printed record of every transaction that has taken place.

In addition to printing the clerks' initials, special characters and amounts on the check strip, suitable devices print upon the face of each check a consecutive number and date. An electrotype also prints upon the check the name of the company or any additional matter such as an advertisement of the establishment in which the machine is used. A sample of the work accomplished by the check printer is illustrated in Fig. 9.

Figure 4:
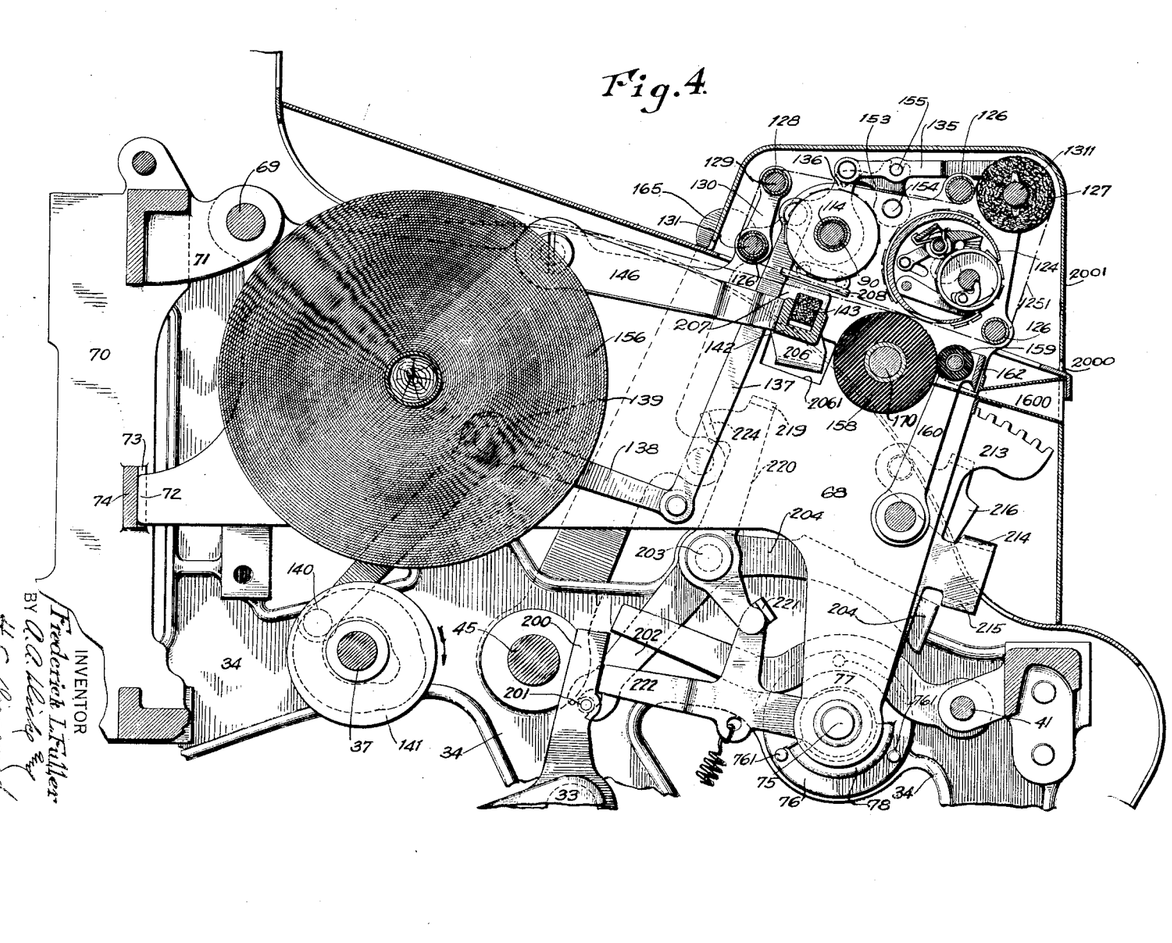
Fig. 4 is a sectional view of the machine taken inside of one of the printer supporting frames and shows part of the improved interlocking mechanism.

The printing mechanism for printing upon checks or inserted slips is supported by two vertical side plates 67 and 68, the upper rear ends of which are supported by a bolt 69 passing through the ears 71 carried by the rear supporting machine frame 70. See Figs. 3, 4 and 6. The lower rear portion of the side plates 67 and 68 have extensions 72 projecting into milled vertical slots 73 formed in the portion 74 of the machine frame 70. As best shown in Fig. 4 the vertical plate 68 extends downward and is suitably apertured to receive one end of a shaft 75, the other end of which is carried by the left machine frame 34. Secured to the inside of the machine frame 34 by screws 761 (Figs. 2 and 4) is a circular plate 76 connected to a plate 77 by a yoke member 78 (see Figs. 2, 5 and 6) the purpose of this construction being to provide a firm support for the shaft 75.

Figure 5:
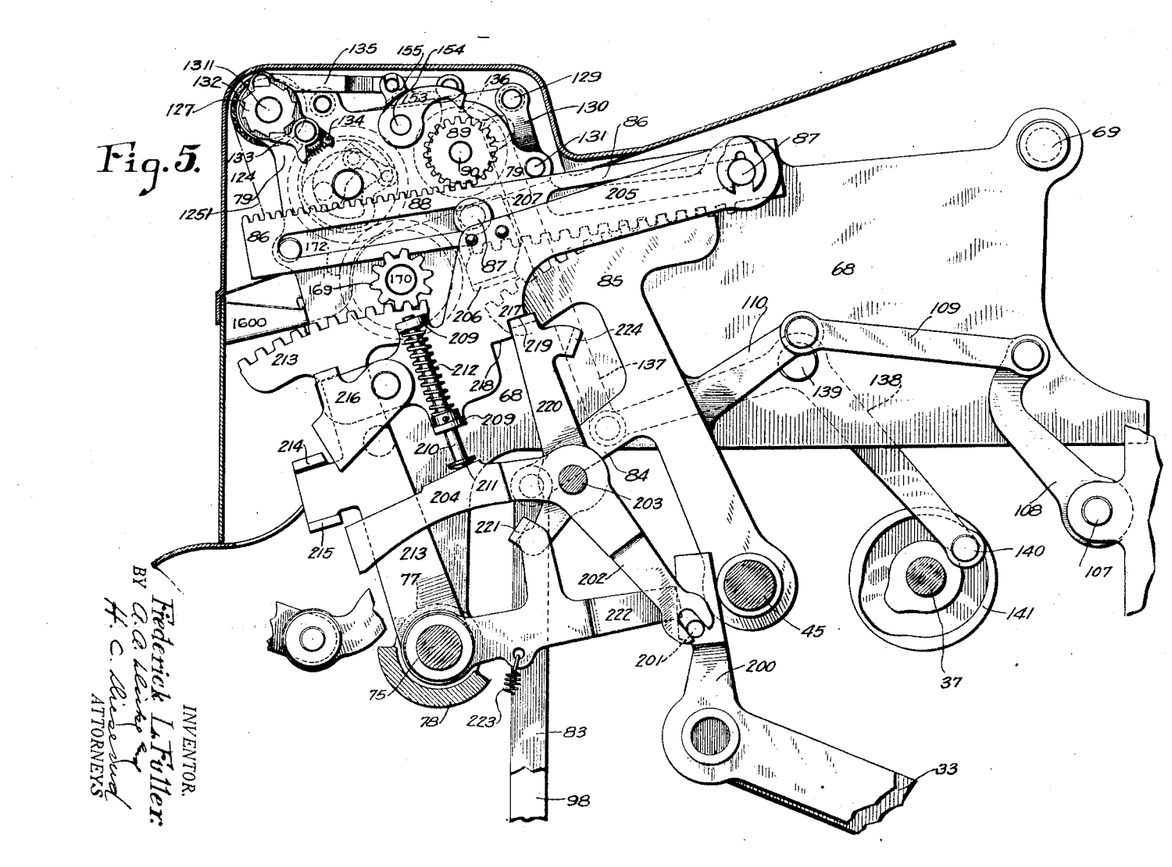
Fig. 5 is a sectional view of the machine showing the interlocking mechanism, the segmental racks and rack bars for driving the type carriers as well as the automatic testing device for controlling the operation of the interlocking mechanism.

As best shown in Fig. 5, the forward portion of side plate 68 is extended upwardly at 79 and riveted to this are the shafts for supporting an electro or printing roller, the inking ribbon and its guide rollers, etc. At their other ends these shafts are secured to a plate 80 as best shown in Fig. 3. It will be observed that a clearance 81 is provided between the lower edge of the plate 80 and the upper edge of the supporting plate 67. This clearance is to permit the insertion of slips which are to be imprinted and to facilitate the threading of the check paper.

The connections between the type carriers associated with the check or inserted slip printing mechanism and the different differentially actuated members will now be described.

At the extreme right hand end of the shaft 41 which, it will be recalled, is rocked when the "B" key 39 is depressed, there is secured an arm 82 (Fig. 2) connected as its extreme rear end to the lower end of a link 83 (Fig. 5). The link 83 is connected to an extension 84 of a segmental rack 85 loosely pivoted upon the segment shaft 45 and meshing with this segmented rack is a horizontal rack 86. The rack 86 as well as the others (Fig. 6) which will be described presently are mounted outside of the frame 68 and are suitably guided in their reciprocable movements by guide studs 87.

The upper and forward edge of the rack 86 is provided with teeth 88 meshing with a pinion 89 (Figs. 5 and 7) secured to a transverse shaft 90 journaled at one end in the side plate 80 and extending through and beyond the plate 68. Secured to the other end of the shaft 90 is a type carrier 91 bearing characters for printing A or B.

Secured by means of hubs 94 to a sleeve 92 surrounding the shaft 41 are cam plates 93 provided with slots (not shown) cooperating with studs 95 carried by each of the transaction keys 59, 60, and 61. The cam slots are inclined differentially so that the keys 59, 60 and 61 will rock the sleeve 92 different amounts. In longitudinal alignment with the sleeve 92 is a sleeve 96, the two being connected by a yoke 971. An arm 97 secured to the sleeve 96 is connected to a link 98 (Fig. 5) which in turn is connected to a segmental rack 99 (Fig. 6) meshing with a longitudinally movable rack bar 100 similar to the rack 85 and rack bar 86 of Figure 5. The upper edge of the rack bar is provided with teeth meshing with a pinion 101 secured to a tube 102 surrounding the shaft 90 and carrying at its other end a type carrier 103 (Fig. 7) having on its periphery type for printing characters to represent the various classes of transaction. From the foregoing it is clear that the differential movements of the sleeves 92 and 96 by the associated keys will effect corresponding movements of the type carrier 103 to its various printing positions.

As shown in Fig. 2, the differential frame 57 associated with the dollars keys is provided with an upwardly extending arm 104 which is connected by a link 105 with an arm 106 secured to a shaft 107 which is journaled in lugs on the back frame of the machine. To the shaft 107 at its right end is secured an arm 108 (Fig. 5) connected by a link 109 to a rearward extension 110 of a segmental rack 111 in mesh with a rack bar 112. The rack bar 112 is in mesh with a pinion 113 secured to a tube 114 (Figs. 4 and 7) loose on the tube 102 carrying at its left end a type wheel 1141 for printing characters to represent the dollars.

Figures 6, 8, 10, 11:
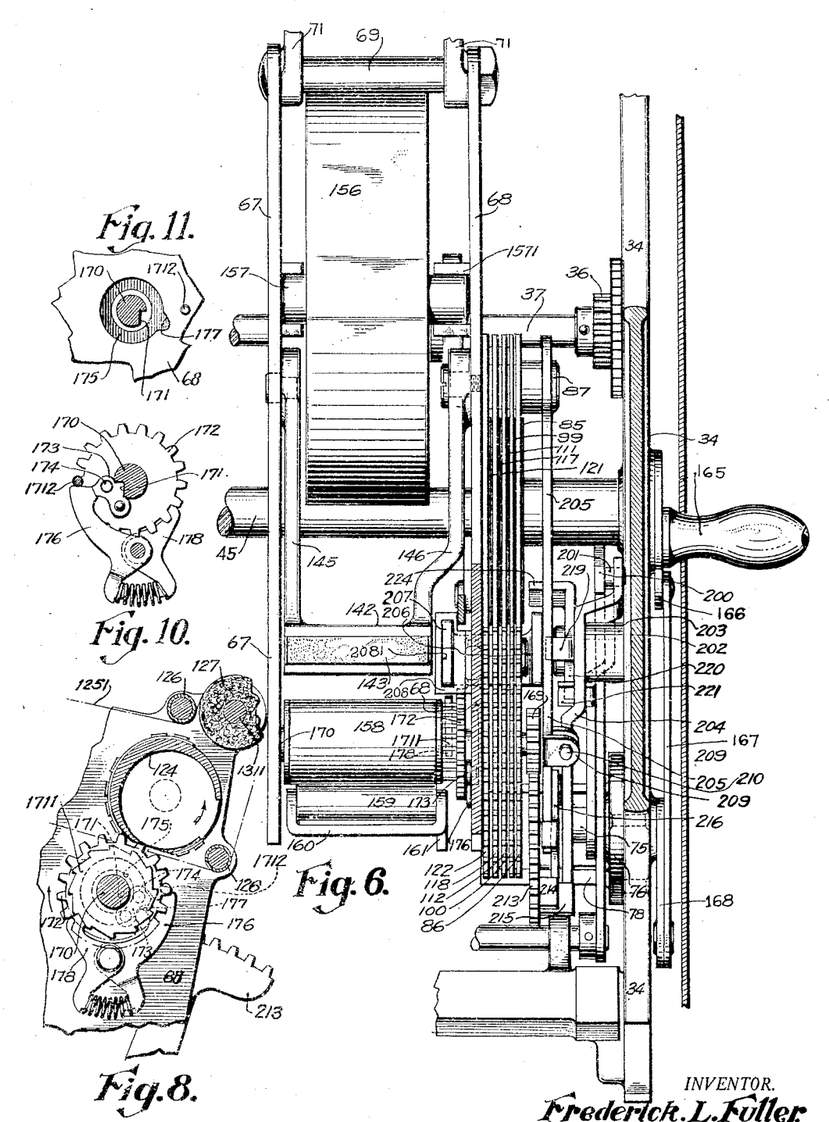
Fig. 6 is a top plan view of the improved printing mechanism and some of the operating connections and interlocking devices.
Fig. 8 is a collective view showing the improved mechanism for driving the electro.
Fig. 10 is a detail view of the electro driving mechanism.
Fig. 11 is a view showing the slot in the printer frame which coacts with part of the electro driving devices.
Figure 7:
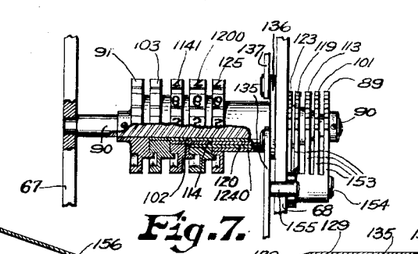
Fig. 7 is a partial sectional view showing the connections between the type carriers and pinions for driving the same, and part of the type aligning mechanism.

Secured to the differentially movable frame 54 for the dimes keys by a hub 115, (Fig. 2) is a tube 116 overlying the shaft 45 previously referred to. At the right end of the tube 116 is secured a segmental rack 117 (see also Fig. 6) meshing with a rack bar 118 which is in mesh with a pinion 119 (Fig. 7). The pinion 119 is connected to a type wheel 1200 for printing characters representing the amounts 10¢ to 90¢ by a tube 120 overlying the tube 114 just referred to.

For adjusting the type carrier representing the cents registered, there is provided a segmental rack 121 (Fig. 2) which is pivoted upon the sleeve 116 and pinned directly to the cents differential frame 51. The segmental rack 121 is in mesh with a rack bar 122 (Fig. 6) which is in mesh with a pinion 123 (Fig. 7) connected by a tube 1240 to a type carrier 125 for printing the characters representing 1¢ to 9¢.

The ink for printing from the different type carriers, as well as an electro 124 and printing type carried thereby, is supplied by an endless inked ribbon 1251 (Figs. 3, 4, and 5) passing below the type carriers and electro, around supporting rollers 126 and 128 and a roller 127 of felt or other material capable of carrying an ink supply for the ribbon. The roller 128 is rotatable on a rod 129 supported by an arm 130 pivoted at 131. A coil spring (not shown) is wound around this pivot 131, one end being secured to the arm 130 serving to maintain a certain amount of tension upon the ribbon 1251.

The ribbon is given a step of movement at each operation of the machine. This not only prevents successive impressions through the same portion of the ribbon, but it also serves to bring the different portions of the ribbon into contact with the roller 127 and thereby permit it to moisten or apply ink to the ribbon. This mechanism is best shown in Figs. 4 and 5. Secured to the shaft 1311 which supports the inking roller 127 is a ratchet disk 132, the teeth of which are engaged by a spring-pressed feeding pawl 133 carried by an arm 134 loose on the shaft 1311. The arm 134 is connected by a link 135 to a short bell crank 136 loose on the tube 1240 the horizontal arm of the said bell crank being connected by a link 137 to a second bell crank 138 pivoted at 139 outside of the vertical side plate 68. One arm of the bell crank is provided with a roller 140 in co-operation with a cam slot formed in a box cam 141 carried by the rotation shaft 37. The shaft 37, it will be recalled makes a complete rotation at each operation of the machine and the mechanism just described is so proportioned and connected that at each operation of the machine the feeding pawl 133 will be operated to impart a step of movement to the ratchet disk 132 and the inking roller 127.

The impressions are taken from the amount type carriers by a percussion hammer 142 (Figs. 4 and 6) provided with an impression block 143 of rubber or other suitable material and of sufficient length to take an impression from all the type carriers. As best shown in Fig. 6, the hammer 142 is supported by arms 145 and 146 journaled in the vertical side plates 67 and 68 respectively.

Printing movement is imparted to the impression hammer by an arm 1461 (Fig. 3) pivoted at 147 to the side plate 67. The forward edge of the arm 1461 has a shoulder 148 engaging a downward extension 149 of the arm 145 previously referred to. Near its lower end the arm 1461 carries a roller 150 in the plane of rotation of a cam 151 fastened to the rotation shaft 37. During the rotation of the shaft 37 the cam will act against the roller 150 to swing the arm 1461 rearward against the tension of a spring 152 until the cam passes out of engagement with the roller 150 whereupon the spring 152 will snap the arm 145 upward to bring the impression block against the type. This printing movement is effected at substantially the end of the downward stroke of the keys at which time the type carriers are retained in their adjusted positions.

To suitably align the type to print along a horizontal line, a plurality of aligning pawls 153 (Figs. 4 and 5) are provided. These pawls are rigid together and are mounted loosely upon a rod 154. In order to rock the pawls into engagement with the pinions to align the type advantage is taken of the movement of the link 135 associated with the inking ribbon feeding mechanism. As best shown in Fig. 4 one of the aligning pawls is bifurcated at its upper end to engage a short stud 155 carried by the link 135, so that the reciprocating movement of the link will move the pawls in and out of engagement with the type carrier pinions.

The checks printed and issued by the machine are drawn from a roll 156 (Figs. 3, 4, and 6) of paper or other suitable material loosely supported by a rod 157 having its ends engaging slots 1571 in the side plates 67 and 68, the construction being such that the roll of paper may be readily withdrawn or a new one readily inserted for replenishing the paper supply. The strip passes from the supply roll 156 between the inking ribbon 1251 and impression block 143, under the electro 124 and between a roller 158 and 159 and into receptacle 1600 formed in the cabinet of the machine. The roller 159 is journaled between two spring-pressed arms 160 and 161 connected by a cross bar 162, the lower edge of which is formed to serve satisfactorily as a tearing guide for the check strip.

Reference has been made heretofore to an electro 124 which is adapted to print a consecutive number and date besides additional matter as shown in Fig. 9. The electro is given a full rotation during each reciprocation of a check handle by means which will presently be described, and is adapted to feed the check out of the machine. The dating wheels are contained within the cylindrical electro, and in axial alignment with these type wheels are the consecutive number wheels, the units order of which is actuated during each check feeding operation to add a unit to the number standing upon the wheels. Such mechanism is well known in the art, but for further information as to the details of construction and operation reference may be had to patents to Carney, #497,861 and Wells #1,151,747.

The electro 124, as previously stated, is given a complete rotation during each operation of a check issuing lever 165 and the means for accomplishing this will now be set forth.

This mechanism is best shown in Figs. 5, 6, and 8. Loosely pivoted upon a hub integral with the side frame 34 and in longitudinal alignment with the segment shaft 45 is a lever 165, the upper end of which protrudes through a slot in the casing and is provided with a handle for external manipulation thereof. The check lever 165 is provided with a forward extension 166 (Fig. 6) connected to which is a link 167 (Fig. 3) which in turn is connected to an arm 168 secured to the shaft 75 previously referred to. Secured to the shaft 75 is a segmental rack 213 in continuous mesh with a driving pinion 169, Fig. 5, secured to a shaft 170. The shaft 170 is journalled between the printer side frames 67 and 68 and is provided with a notch 171 (Figs. 8 and 10). Loosely mounted upon the shaft 170 is the roller 158 previously referred to and secured to the roller so as to be movable therewith is a ratchet wheel 1711 and a gear pinion 172, the latter being in continuous mesh with a pinion integral with the electro 124. Pivoted to the gear pinion 172 is a feeding pawl 173 (see Fig. 8) provided with a stud 174 which co-operates with a circular slot 175 formed in the printer side frame 68. The feeding pawl 173 is provided with a projection normally engaging the radial shoulder of the notch 171 in the shaft 170 previously mentioned and is normally spring-pressed into engagement therewith by a pawl 176 pivoted to the printer side frame 68, the movement of the pawl 176 being limited by a pin 1712 carried by the frame 68. The stud 174 is adapted to be cammed at certain times into co-operation with an enlarged or clearance portion 177 of the slot 175. In order to prevent retrograde movement of the roller 158 there is pivoted to the frame 68 a spring-pressed pawl 178.

The operation of the parts just described is as follows: In order to feed a check out of the machine, the check handle 165 is moved rearward, the segment 213 thereby rotating the shaft 170 clockwise as viewed in Fig. 8. The rotation of the shaft 170 will, due to the engagement of the pawl 173 with the radial shoulder of the notch 171 rotate the ratchet wheel 1711, gear pinion 172 and roller 158, thereby feeding the check out of the machine. As the gear pinion 172 is rotated from the position shown in Fig. 8 the stud 174 of pawl 173 will engage the concentric portion of the slot 175 and positively hold the engaging end of the feeding pawl in co-operation with the notch 171 of the shaft until tha shaft and parts carried thereby are given a full rotation. At this time the check lever is now in its extreme rearward position and the parts on shaft 170 are again in the position shown in Fig. 8. Upon drawing the check lever forward the shaft 170 will be rotated counter-clockwise as viewed in Fig. 8, the non-radial portion of the notch 171 first camming the pawl forward, the stud 174 then entering the clearance portion of the slot 177. As the check lever is returned to its normal position the spring-pressed pawl 176 will constantly urge the feeding pawl 173 rearwardly until the shaft again returns to its normal position, whereupon the engaging end of the pawl will snap into the notch 171 formed in the shaft 170.

As stated previously the present embodiment is adapted to print upon inserted slips, the presence of a slip preventing the operation of interlocking devices between the operating keys and check lever, thus allowing repeated operations of the keys without requiring a check to be issued. To control the interlocking mechanism a testing device has been provided.

This mechanism is best shown in Figs. 4, 5 and 6. The testing device is operated during each operation of the machine and comprises an upwardly extending arm 200 secured to the key coupler 33 and provided with a stud 201 engaging a bifurcation of the lower arm of a bell crank 202. As shown in Figs. 2 and 4, the bell crank 202 is pivoted to the side frame 34 by a stud 203 and has a forwardly extending arm 204.

The testing device also comprises a plate 205 pivoted on the rear stud 87 (Fig. 5) and having a bail shaped member 206 (Fig. 6) secured thereto extending through an opening 2061 in the plate 68 and having an upturned portion 207 adapted to contact with the inserted slip. Secured to the inside of the side plate 68 is a horizontal plate 208 (Figs. 4 and 6) which is provided with an elongated slot 2081 to receive the portion 207 when the latter is moved upwardly if it is not stopped by the presence of a slip. Sales slips are inserted in slot 2000 formed in hood 2001 of the cabinet which slips then assume a position between the plate 208 and the upturned portion 207. It may be noted that the sales slips are composed of paper having sufficient rigidity to overcome the tension of spring 212, thus preventing the portion 207 from moving past the said slips during the slip printing operation of the machine. The tension of spring 212 is adjusted so that it is just sufficient to effectively perform the function of lifting the member 205 during the regular operations of the machine. Thus, it is clear that the ordinary paper used for sales slips is sufficient to overcome the tension of this spring. As is clearly shown in Fig. 6, the testing device is disposed at one side of the check paper 156.

For communicating motion from the bell crank 202 to the testing device the following construction is used. The testing device is provided with integral ears 209 (Fig. 5) in which is inserted a plunger 210 having a lower head portion 211 contacting with the upper edge of the forwardly extending arm 204 of the bell-crank 202. A spring 212 forces the plunger 210 downwardly to hold its head 211 in engagement with the arm 204.

From the foregoing it is clear that when the coupler 33 is rocked during operation of the keys the stud 201 will impart a movement to the bell crank 202 and that the arm 204 of the bell crank will force the plunger 210 upwardly. The vertical plate 207 will contact with an inserted slip and prevent any further movement of the testing device 205 and the spring 212 will be compressed during the rest of the movement of the key coupler.

It is, of course, evident that if no slip is to be printed upon a check must be issued. The absence of a slip in the machine permits the following to take place: release the check lever for operation, prevent a movement of the latter until the keys are returned to normal, prevent a second operation of the keys until the check lever has been operated and a check issued, and restoration of the parts to their normal position. These will be taken up in the order named.

The actuating segment 213 is provided with two locking lugs 214 and 215. The lug 214 normally is immediately forward of a locking member 216 pivoted upon the forward end of the testing device 205 so that it locks the check lever against operation. Formed in the lower edge of the testing device 205 are two square shoulders 217 and 218 either of which is adapted to engage a lug 219 formed at the upper end of a bell crank 220 pivoted at 203. The lower end of the bell crank is in engagement with a lug 221 integral with a locking arm 222 loosely pivoted upon the shaft 75. A spring 223 tends to move the bell crank 220 counter-clockwise as viewed in Fig. 5 so that at certain times the lug 219 will co-operate with the shoulder 218.

If no slip is inserted in the machine and the keys are depressed, the following operation will take place: The rocking of the arm 204 will move the plunger 210 upwardly and since a slip has not been inserted the testing device 205 will move upwardly the full distance, the spring 223 rotating the bell crank 220 counter-clockwise until lug 219 rests under the shoulder 218 to retain the testing device in its upward position.

The locking member 216 is now out of the path of the lug 214 thus permitting an operation of the check lever; but it will be remembered that while the testing device was being actuated the forward edge of the arm 204 passed to the rearward of the lug 215 thus preventing any operation of the check lever until the keys are returned to their normal position. When the keys are returned to their normal position, the check lever is unlocked, permitting the issuance of a check upon which has been imprinted the value of the keys and other identifying characters.

It is, of course, desirable that when the machine is placed in a condition for issuing a check that means be provided for preventing a second operation of the keys until the check lever has been actuated and the desired check issued. For accomplishing this the locking lever 222 is provided. When the spring 223 draws the locking arm 222 downwardly to rotate the bell crank 220 counter-clockwise the rear end of locking arm 222 drops in front of the stud 201 carried by the arm 200 previously referred to when that arm returns to the normal position shown in Fig. 5. This will block any attempted movement of the coupler and prevents the keys from being operated until a check has been issued.

It will, of course, be necessary to return the parts to their normal position shown in Fig. 5 after a check has been issued. For accomplishing this the following has been provided:

As shown in the plan view of Fig. 6 the bell crank 220 is provided with a second lug 224 which is slightly longer than the lug 219 previously mentioned and it should be noted that the lug 224 is in the plane of the actuating segment 213. When the segment 213 is moved rearward from its position shown in Fig. 5 it will contact with the lug 224 and drive the bell crank 220 rearward until the lug 219 is brought under the shoulder 217. This will allow the testing device to drop downward by virtue of its own weight and when the segment 213 has been returned to its normal position the locking member 216 and lug 214 will be brought into locking engagement preventing a second operation of the check lever without an intervening operation of the keys.

It will be obvious that the locking arm 222 is also drawn upwardly during this operation bringing it out of the path of the stud 201 at the position shown in Fig. 5 thus permitting the keys to be depressed.

It will be seen that this mechanism provides in a very satisfactory manner a means for effecting the desired results; that is, to permit the operation of the check lever only when a check is desired and to prevent any fraudulent or irregular operations of the machine.

In describing the construction of the improved machine it has been necessary incidentally to describe the operation of the various features to such an extent that it is thought that the usual summary of the operation of the machine may be omitted.

While the embodiment herein shown and described is well adapted to fulfill the objects above stated, it is not the intention to limit the invention to the one form, as it is capable of various modifications and changes all coming within the scope of the claims which follow:

What is claimed is:

1. In a cash register, the combination with mechanism for printing upon issued checks or inserted slips, of a manipulative lever for issuing said checks, means for locking said manipulative lever, and means dependent upon the absence of an inserted slip for disabling the locking means whereby the manipulative lever is freed for operation.

2. In a cash register, the combination of a plurality of operating keys, a printing mechanism controlled thereby for printing either upon issued checks or inserted record material characters in accordance with the keys depressed, a normally locked check issuing mechanism, said mechanism being manually operable separately from the printing mechanism, and means controlled by the inserted record material for locking the check issuing mechanism.

3. In a cash register, the combination of mechanism for printing either upon inserted slips or issued checks, a normally locked manually operable check issuing lever, a testing device, and means controlled thereby for unlocking the check lever.

4. In a cash register, the combination of an operating mechanism for printing either upon inserted slips or issued checks, a normally locked manually operable check lever, a testing device having connections to the operating mechanism and operable during each operation of the machine, and means controlled thereby for unlocking the check lever.

5. In a cash register, the combination of a plurality of keys, mechanism operated by said keys for printing upon inserted slips or issued checks, a normally locked manually operable check lever for issuing checks, a testing device adapted to be stopped by an inserted slip, and devices controlled by the testing device when so stopped to prevent release of the check lever for operation.

6. In a cash register, the combination of a plurality of keys, devices operated by said keys for printing upon either issued checks or inserted slips, a normally locked manually operable check lever for issuing checks, a testing device operated during each operation of the machine adapted to be stopped by the presence of an inserted slip, and devices controlled by the testing device when so stopped to prevent release of the check lever for operation.

7. In a cash register, the combination of a plurality of operating keys, a manually operable check lever for issuing printed checks, means for normally locking said check lever, mechanism operated by said keys for printing upon said checks and on other material, automatic means for controlling the locking means in accordance with whether or not the printing mechanism is operated for printing upon material other than on checks.

8. In a cash register, the combination of a manually operable check lever for issuing printed checks, a member normally locking the check lever, a check printing mechanism operable while the check lever is locked, and a testing device for permitting the movement of said member to release the check lever for operation.

9. In a machine of the class described, the combination of a printing mechanism for printing upon either issued checks or inserted slips, a normally locked check lever for issuing checks, automatic means for unlocking the check lever when the printing mechanism is operated with no slip inserted, and means for preventing a second operation of the check lever until an intervening printing operation is effected.

10. In a cash register, the combination with keys, of printing mechanism controlled by the keys for printing either upon issued checks or inserted slips, a normally locked check lever for issuing checks, automatic means for unlocking the check lever when the printing mechanism is operated with no slip inserted, and means for preventing a second operation of the check lever until an intervening operation of the keys is effected.

11. In a cash register, the combination with keys, of printing type controlled by the keys for printing upon either issued checks or inserted slips, a check lever for issuing the printed checks, means for normally locking said check lever, automatic means for disabling said means when the machine is operated with no slip inserted, and means for preventing a second operation of the check lever until an intervening operation of the keys is effected.

12. In a cash register, the combination with a plurality of keys, a printing mechanism controlled by the keys for printing either upon inserted slips or issued checks, a normally locked check lever for issuing checks, a member operated to unlock the check lever when the machine is operated with no slip inserted, and means controlled by said member for locking the keys when the member is in unlocking relation with the check lever.

13. In a cash register, the combination of a printing mechanism for printing upon inserted slips or issued checks, a manually operable check lever for issuing checks, a testing device controlled by slips for determining whether the check lever is to be locked, and means for locking the check lever during the operation of the testing device.

14. In a cash register, the combination of a plurality of keys, type carriers set under the control of the keys, an operating mechanism, an inking ribbon, a member provided with a feeding pawl having connections to the operating mechanism for feeding the ribbon an increment during each item entering operation, a plurality of pawls for aligning the type carriers, and means carried by said member for operating the aligning pawls.

15. In a cash register, the combination of a roller for feeding printed checks out of the machine, a shaft carrying said roller provided with a notch, a check handle for rotating the shaft, a feeding pawl movable with the roller and engaging said notch, a stud upon the feeding pawl and a slot co-operating with said stud for positively holding the feeding pawl in engagement with the notch.

16. In a cash register, the combination of a roller for feeding printed checks out of the machine, a shaft carrying said roller provided with a notch, means for oscillating the shaft, a feeding pawl movable in unison with the roller and normally engaging said notch, a stud upon the feeding pawl, a slot co-operating with said stud for positively holding the feeding pawl in engagement with the notch when the said shaft is oscillated in one direction, said slot being formed with a portion to permit the feeding pawl to be cammed out of engagement with the notch when the shaft is oscillated in an opposite direction.

17. In a cash register, a printing mechanism operable to print upon different classes of record material, a keyboard for controlling said mechanism, means comprising a handle operable to feed record material of one class, devices normally requiring operation of the keyboard and feeding means in a fixed sequence when the printing is effected on material of said one class, and mechanism for automatically rendering said devices ineffective when the printing is effected upon material of another class.

18. In a cash register, a printing mechanism for printing upon inserted slips or upon checks to be issued from the machine, means comprising a manually operable handle for issuing the checks, interlocking mechanism normally effective to compel alternate operation of the printing mechanism and handle to print and issue checks, and devices whereby insertion of a slip will disable said interlocking mechanism and permit successive operations of the printing mechanism.

19. In a cash register, the combination of a printing mechanism constructed to print upon checks or upon inserted slips, a keyboard controlling the printing mechanism, a manually operable check issuing mechanism, means normally preventing successive operations of the printing mechanism until intervening operations of the issuing mechanism, effected, and devices controlled by inserted slips for disabling said means.

20. In a cash register, the combination with a keyboard of a printing mechanism constructed to print upon checks or upon inserted sales slips and controlled by the keyboard, mechanism comprising a manually operable handle for issuing the checks printed upon, devices normally rendered effective by operation of the keyboard to prevent another operation of the keyboard until an intervening operation of the check issuing handle is effected, and mechanism whereby operation of the keyboard to effect printing upon an inserted slip will prevent said devices from becoming effective.

21. In a cash register, the combination with a keyboard, of a printing mechanism controlled by the keyboard and constructed to print upon checks or upon inserted slips, mechanism comprising a manually operable handle for issuing the checks, devices rendered effective as an incident to printing upon a check for locking the keyboard means for releasing said locking devices by operation of the check issuing handle, and means whereby when printing is effected upon an inserted slip the latter will prevent the aforesaid devices from becoming effective.

22. In a cash register, the combination with a printing mechanism constructed to print upon checks or upon inserted slips, of keys and connections for operating the printing mechanism by operations of the keys, manually operable mechanism for feeding checks out of the machine after they are printed upon, interlocking mechanism normally requiring operation of the feeding mechanism to issue the check printed upon before the keys can again be operated, and means controlled by inserted slips for rendering said interlocking mechanism ineffective during slip printing operations.

23. In a cash register, the combination with a keyboard, of printing mechanism controlled by the keyboard, a casing for the mechanism having a slot to receive inserted slips, a member having an invariable movement at each operation of the printing mechanism, a second member movable across the slot in the casing, a spring for transmitting movements of the invariably moved member to the second member, a paper feeding mechanism, and a lock for said mechanism, said lock co-operating with the aforesaid second member and controlled by the presence or absence of an inserted slip.

24. In a cash register, paper feeding mechanism comprising a feeding roller, a shaft having a notch comprising a radial shoulder and a cam portion, a member rigid with the roller and rotatable on the shaft, a pawl mounted on said member and constructed to co-operate with the radial shoulder and the cam portion of the notch in the shaft, means for driving the shaft a full turn forward and then back to its starting point, a stud on the pawl, a circular groove co-operating with the stud to hold the driving pawl in engagement with the radial shoulder during movement of the shaft in one direction, a clearance to receive said stud at the beginning of the movement of the shaft in the other direction when the cam portion of the notch becomes effective, and a spring for holding the pawl against the shaft.

25. In a machine of the character described, the combination of a plurality of type carriers, a platen adapted to print upon either an inserted slip or issued checks, means for issuing checks, and means responsive to the presence or absence of a slip for controlling the operating of the check issuing means.

26. In a cash register, the combination with a plurality of keys, a printing mechanism controlled by the keys for printing either upon inserted slips or issued checks, a normally locked check lever for issuing checks, means obstructing simultaneous operation of said keys and said lever, a member operated to unlock the check lever when the machine is operated with no slip inserted; and means controlled by said member for locking the keys when the member is in unlocking relation with the check lever.

27. In a cash register, the combination with mechanism for printing upon issued checks or inserted slips, means for issuing said checks, means for locking said check issuing means, means dependent upon the absence of an inserted slip for disabling the locking means whereby the check issuing means is freed for operation, means for holding the locking means disabled, and means whereby operation of said check issuing means disables said holding means.

28. A cash register comprising a plurality of keys, a device controlled by said keys for printing upon inserted slips, a device for issuing checks, means for locking said keys, means responsive to the presence of an inserted slip for preventing the operation of said locking means, and means responsive to the operation of the check issuing device for disabling said locking means.

29. In a cash register, a plurality of operating keys, mechanism controlled by the keys for printing upon an inserted slip, a feeler for locking said keys in the absence of an inserted slip, said feeler being actuated toward its locking position by an initial operation of the keys to prevent a subsequent movement of the keys, said feeler being adapted to be arrested by an inserted slip whereby to permit said subsequent movement of the keys, and manually operable means independent of said inserted slip for unlocking the keys.

30. In a cash register, a plurality of operating keys, a check printer, mechanism controlled by the keys for printing upon an inserted slip, a feeler for locking said keys in the absence of an inserted slip, said feeler being actuated toward its locking position by an initial operation of the keys to prevent a subsequent movement of the keys, said feeler being adapted to be arrested by an inserted slip whereby to permit said subsequent movement of the keys, and means operable independently of said inserted slip for simultaneously issuing a check and unlocking said keys.

In witness whereof I have signed my name hereto this 10th day of March, 1926.
FREDERICK L. FULLER.